United States Patent [19]

Ming

[11] Patent Number: 4,956,588

[45] Date of Patent: Sep. 11, 1990

[54] ATTACHABLE HAND-OPERATED/AUTOMATIC DUAL USAGE VENETIAN BLIND CONTROLLER

[76] Inventor: Nien Ming, Room C. 4th Fl., No. 99, Jen-Ai Rd., Sec. 4, Taipei, Taiwan

[21] Appl. No.: 454,463

[22] Filed: Dec. 21, 1989

[51] Int. Cl.[5] .................... H04Q 9/02

[52] U.S. Cl. .................... 318/16; 318/53; 318/434; 318/469; 318/480; 160/331

[58] Field of Search .................... 318/16, 34, 35, 51, 318/53, 54, 280, 287, 434, 466, 468, 469, 480; 160/330, 331; 49/340, 349, 357, 360

[56] References Cited

U.S. PATENT DOCUMENTS

| | | | |
|---|---|---|---|
| 3,269,454 | 8/1966 | Gill et al. | 160/331 |
| 3,403,474 | 10/1968 | Spasoff | 49/360 |
| 3,646,985 | 3/1972 | Klann | 160/5 X |
| 4,618,804 | 10/1986 | Iwasaki | 318/16 |
| 4,819,708 | 4/1989 | Onosato et al. | 160/331 |
| 4,827,199 | 5/1989 | Kaucic et al. | 160/331 X |

*Primary Examiner*—Bentsu Ro
*Attorney, Agent, or Firm*—Asian Pacific Int'l Patent and Trademark Office

[57] ABSTRACT

This invention relates to an attachable hand-operated-/automatic dual usage venetian blind controller which can be attached to an existing venetian blind to set the blades of such a venetian blind together at any angle or to draw up the blades together to one side of the window by means of infrared remote control so as to regulate the light and air passing through. During power failure, the venetian blind can be controlled through hand operation without removing the controller. The controller of this invention is generally comprised of two DC motor and speed reducing gear set assemblies, two guide wheels, two pressure wheels, a beading cord driving wheel, a pull cord driving wheel, an infrared receiver control circuit, and an infrared transmitter.

4 Claims, 8 Drawing Sheets

ATTACHABLE HAND-OPERATED/AUTOMATIC DUAL USAGE VENETIAN BLIND CONTROLLER

BACKGROUND OF THE INVENTION

Venetian blind is a window blind made of a number of thin, wooden, metal or plastic slats that can be set together at any angle to regulate the light and air passing through or be drawn up together to the top or one side of the window by means of cords. To an ordinary people, a venetian blind is easy to regulate by means of cords through hand operation. However, to hospitalized patients or disabled people or the aged, it is rather difficult to regulate a venetian blind which is mounted on a window of higher position. The present invention is specifically designed to give a total solution to the problem. According to the present invention, a venetian blind can be regulated through infrared remote control. Even if during power failure, hand operation function can still be operated to regulate the venetian blind by means of cords.

SUMMARY OF THE INVENTION

A venetian blind controller of this invention is generally comprised of two DC motor and speed reducing gear set assemblies, two guide wheels, two pressure wheels, a beading cord driving wheel, a pull cord driving wheel, an infrared receiver control circuit, and an infrared transmitter. The DC motor and speed reducing gear set assemblies each includes a speed reducing gear mounted on a DC motor with an elongated shaft projecting upward therefrom to carry a beading cord driving wheel (or pull cord driving wheel) to rotate. The beading cord driving wheel has a semi-circular center hole for insertion therein of the semi-circular top end of the elongated shaft of either DC motor and speed reducing gear set assembly, and it follows the linking-up DC motor to rotate during operation. If the linking-up DC motor is stopped due to power failure, the beading cord driving wheel is still allowed to rotate freely.

BRIEF DESCRIPTION OF THE DRAWINGS

FIG. 2B is a schematic drawing of a conventional venetian blind, in which venetian blades are pulled out to regulate the light and air passing through;

DETAILED DESCRIPTION OF THE PREFERRED EMBODIMENTS

Figure 1:
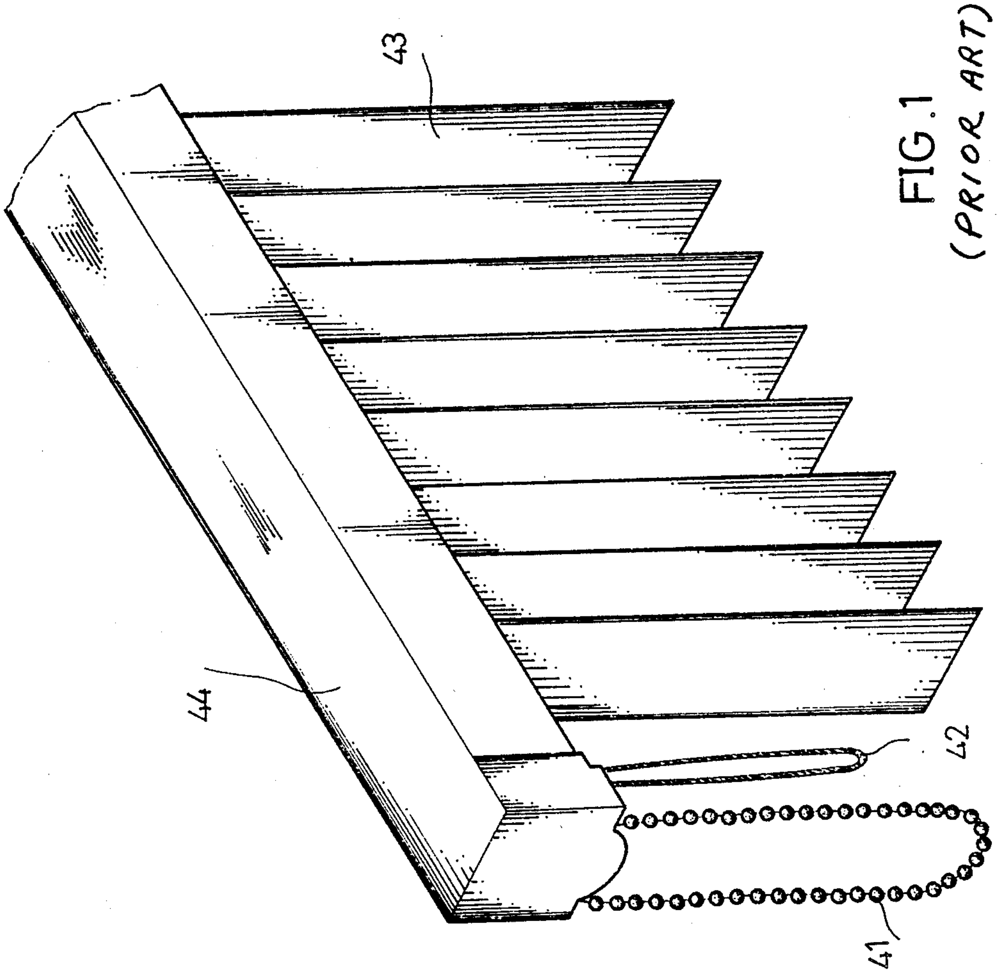
FIG. 1 (PRIOR ART)
FIG. 1 is a perspective view of a conventional venetian blind.

FIG. 1 is a perspective view of a conventional vertical type venetian blind, in which a pull cord of beads (41) is used to regulate the angular position of venetian blades (43); another pull cord (42) is used to draw up the venetian blades (43) together to the left or right through a track (44) so as to block up the light or air or let the light or air passing through.

Figure 2A:
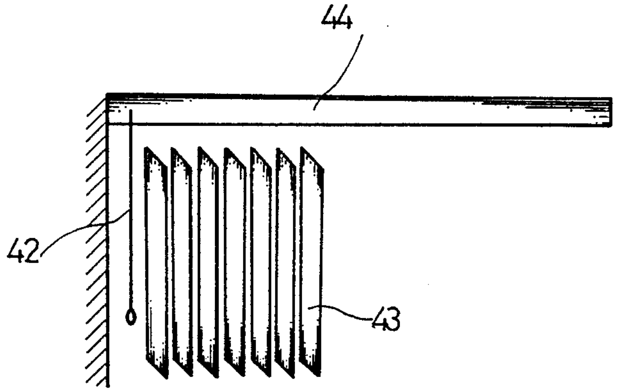
FIG 2A (PRIOR ART)
FIG. 2A is a schematic drawing of a conventional venetian blind, in which the venetian blades are drawn up together to the left side of the window.
Figure 2B:
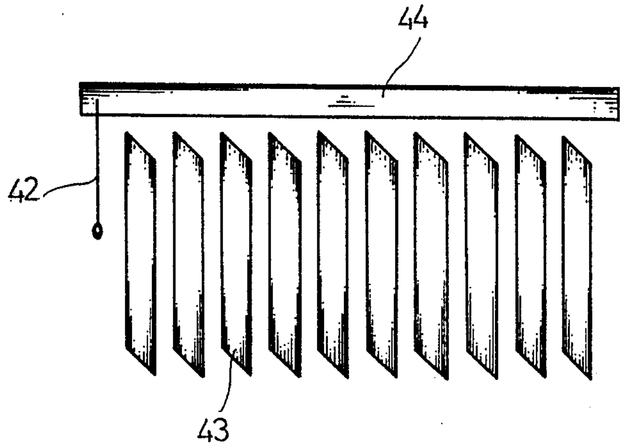
FIG. 2B (PRIOR ART)

FIG. 2A is a schematic drawing of a conventional venetian blind in which venetian blades are drawn up together to the left side of the window, and FIG. 2B illustrates that the venetian blades are pulled out to regulate the light and air passing through. The operation of drawing up and pulling out the venetian blades is commonly controlled by means of a pull cord (42).

Figure 3:
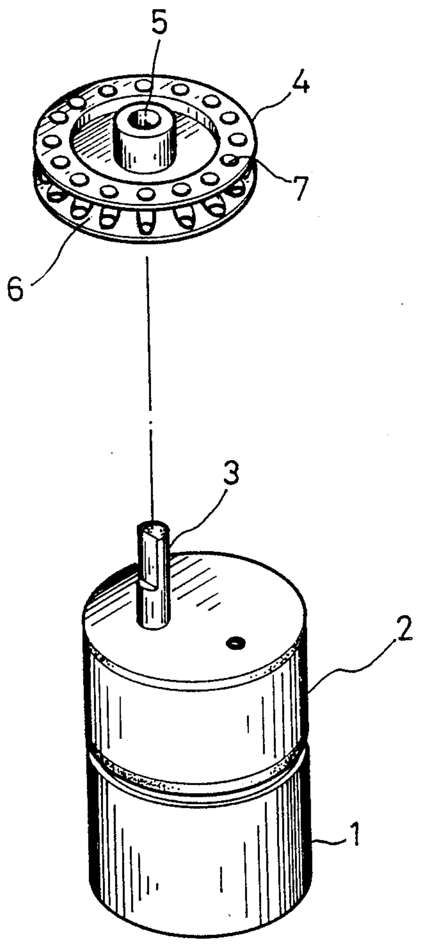
FIG. 3 is a perspective fragmentary view of a DC motor and speed reducing gear set assembly according to the present invention.

FIG. 3 is a perspective fragmentary view of a DC motor and speed reducing gear set assembly according to the present invention. As illustrated, a speed reducing gear set (2) is mounted on a DC motor (1) with an elongated shaft (3) projecting upward therefrom to carry a beading cord driving wheel (4) to rotate. The beading cord driving wheel (4) has a semi-circular center hole (5) for insertion therein of the semi-circular top end of the elongated shaft (3), a circular channel (6) for mounting thereon of a beading cord, and a plurality of round holes (7) bilaterally disposed on the two circular side walls defined by the circular channel (6).

Figure 4:
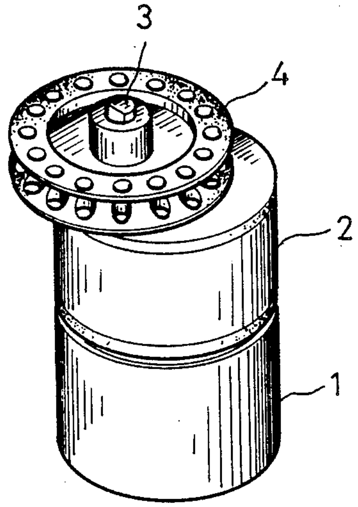
FIG. 4 is a perspective assembly view of a DC motor and speed reducing gear set assembly according to the present invention.

Referring to FIG. 4, the beading cord driving wheel (4) is coupled with the speed reducing gear set (2) and firmly secured to the semi-circular top end of the elongated shaft (3). When the motor (1) starts to rotate, the beading cord driving wheel (4) is driven to rotate through the operation of the speed reducing gear set (2). The beading cord driving wheel (4) may be replaced by a pull cord driving wheel (16) which can be firmly secured to the elongated shaft (3) by a lock pin (not shown). The speed reducing gear set (2) is specially designed to change the revolving speed of the DC motor (1) to a suitable speed ratio so that the moving of the blades of a venetian blind can be controlled moderately, the blades of such a venetian blind can also be operated by cords through hand operation during power failure.

Figure 5:
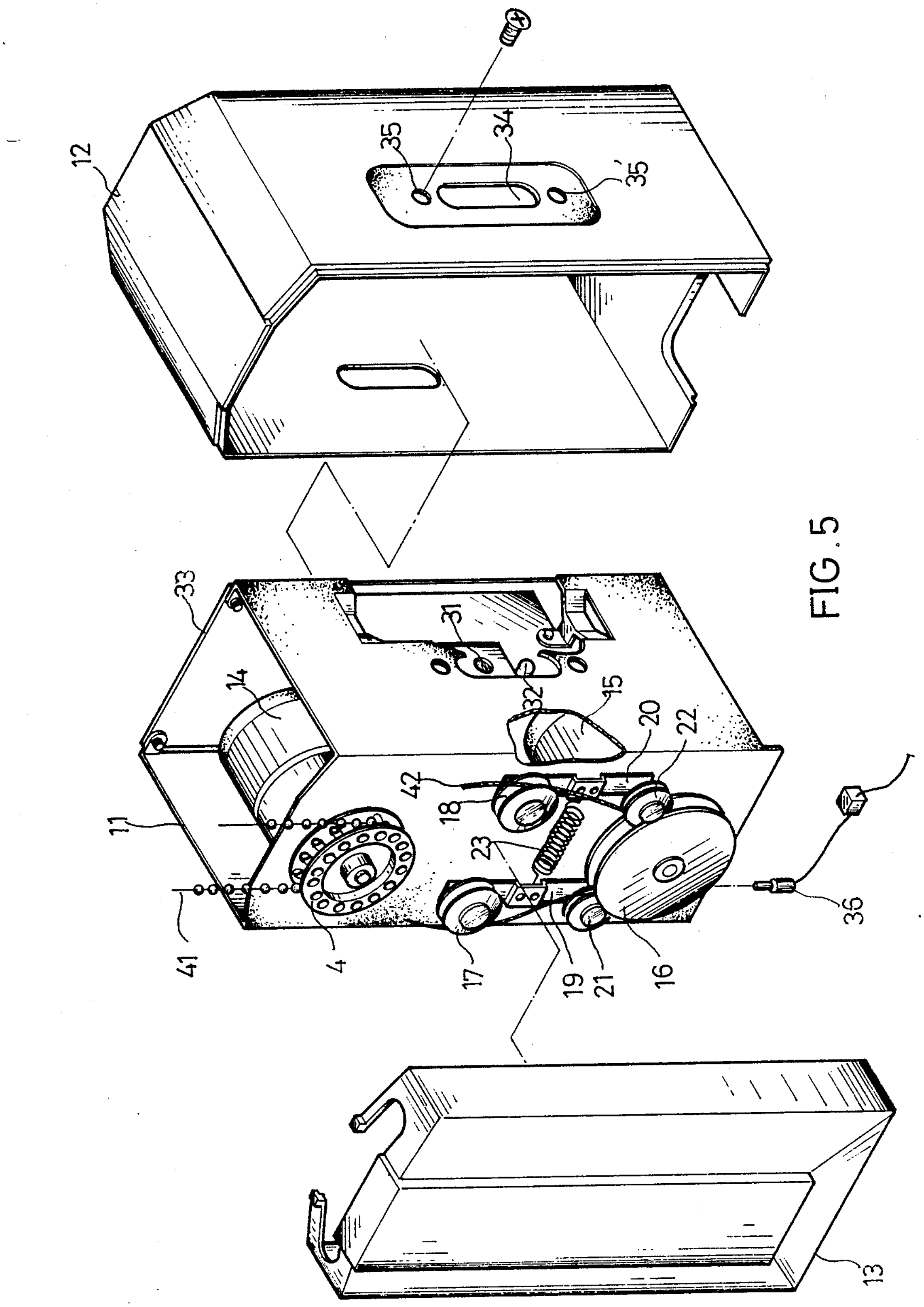
FIGS. 5 and 6 are perspective drawings of a venetian blind controller constructed according to the present invention.
Figure 6:
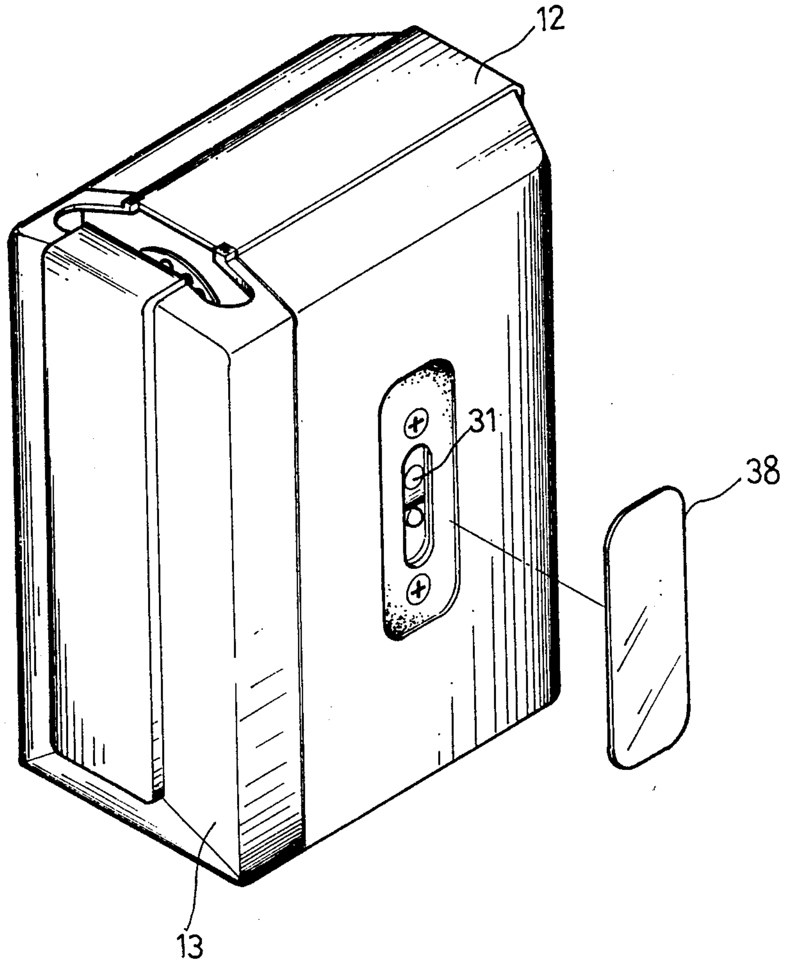

Referring to FIGS. 5 and 6, therein illustrated is a venetian blind controller embodying the present invention and generally comprised of a housing (12), an inner casing (11) received in the housing (12), and a cover (13) covered on the housing (12). The inner casing (11) includes therein two holes for setting therein of two DC motor and speed reducing gear set assemblies (14) and (15) respectively, wherein the DC motor and speed reducing gear set assembly (14) has a beading cord driving wheel (4) mounted thereon, and the DC motor and speed reducing gear set assmebly (26) has a pull cord driving wheel (16) mounted thereon. Two opposite guide wheels (17) and (18) are respectively mounted on two elongated plates (19) and (20) at one ends thereof and firmly secured to the inner casing (11) between the beading cord driving wheel (4) and the pull cord driving wheel (16). Two pressure wheels (21) and (22) are respectively mounted on the two elongated plates (19) and (20) at the opposite ends thereof. A spring (23) is connected between the two elongated plates (19) and (20), to constantly pull the two pressure wheels (21) and (22) inward to press on any cord mounted on the circular channel of the pull cord driving wheel (16). An infrared receiver (31) is positioned in the inner casing (11) to receive signal from infrared transmitter. A control circuit board (33) is externally mounted on the inner casing (11) at the back, to process infrared signal received by the infrared receiver (31) for controlling the operation of the DC motor and speed reducing gear set assemblies (14) and (15). The housing (12) includes a window (34) through which the infrared receiver (31) can efficiently receive external infrared signal, two bolt holes (35) and (35') through which the inner casing (11) can be firmly secured to the housing (12) by screw bolts, and a transparent guard plate (38) attached to the window (34) to filtrate noisy light source and to cover the two bolt holes (35) and (35'). According to the present invention, the pull cord driving wheel (16) is made of resilient plastic material. During installation, the beading cord (41) of a venetian blind is mounted on the beading cord driving wheel (4), the pull cord (42) of such a venetian blind is mounted on the two guide wheels (17) and (18) and the pull cord driving wheel (16) and pressed on the pull cord driving wheel (16) by the two pressure wheels (21) and (22). The suspension portion of the pull cord (42), if any (due to extended length), shall be freely suspending downward and fixed on the window frame. An electrical plug (36) is also provided for connecting the controller to a power source.

Referring to the circuit diagram of the infrared transmitter of the present invention, there is a stop button (91) which is to stop the operation of motor; a close button (92) which is to extend out venetian blades; an angle adjusting button (93) which is to turn the angular position of venetian blades to the left; another angle adjusting button (94) which is to turn the angular position of venetian blades to the right; an open button (95) which is to pull up venetian blades together; two control buttons (96) and (97) which are respectively for controlling two different venetian blinds; an encoder (62) which is to encode normal open buttons (91-97) to transmit signal through infrared transmitter (D1); X1, C, C' which form an oscillation circuit; a diode (D0) which is a light emitting diode and it turns on when infrared transmitter (D1) works; a transistor (Q1) which is to drive diode (D0); another transistor (Q2) which is to drive diode (D1); resistors (R10, R11, R12) which are current-limiting resistors. Any signal from either button is encoded by the encoder (62) to drive the second transistor (Q2) to send a corresponding signal through the infrared transmitter (D1) and simultaneously to send a signal to the first transistor (Q1) to further trigger the light emitting diode (D0) to emit light for indication of the mode in operation. As described above, when the close button (92) or the open button (95) is pressed on, the pull cord (42) will be carried to rotate to further extend out or pull up venetian blades together; when either angle adjusting button (93) or (94) is pressed on, the beading cord (41) will be carried to rotate to further change the angular position of venetian blades; the control buttons (96) and (97) are to drive a controller of the present invention to respectively control two different ventian blinds.

Figure 7:
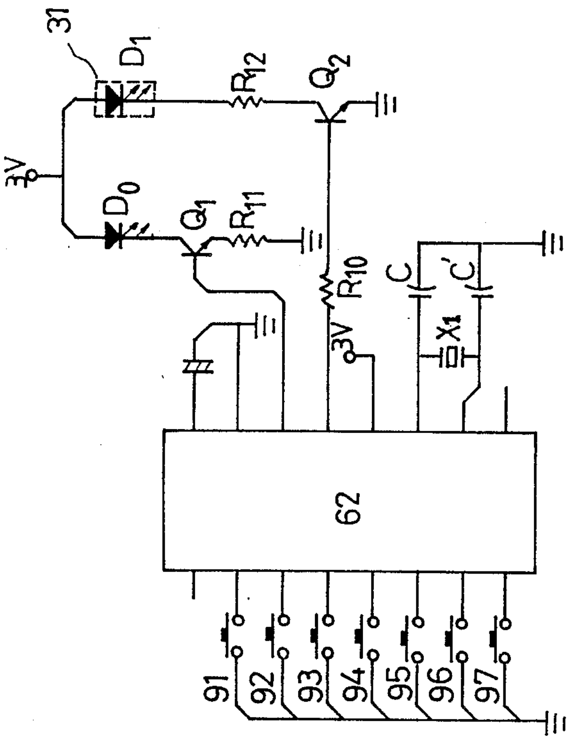
FIG. 7 is a circuit diagram of the infrared remote controlled transmitter of the venetian blind controller indicated in FIGS. 5 and 6.
Figure 8:
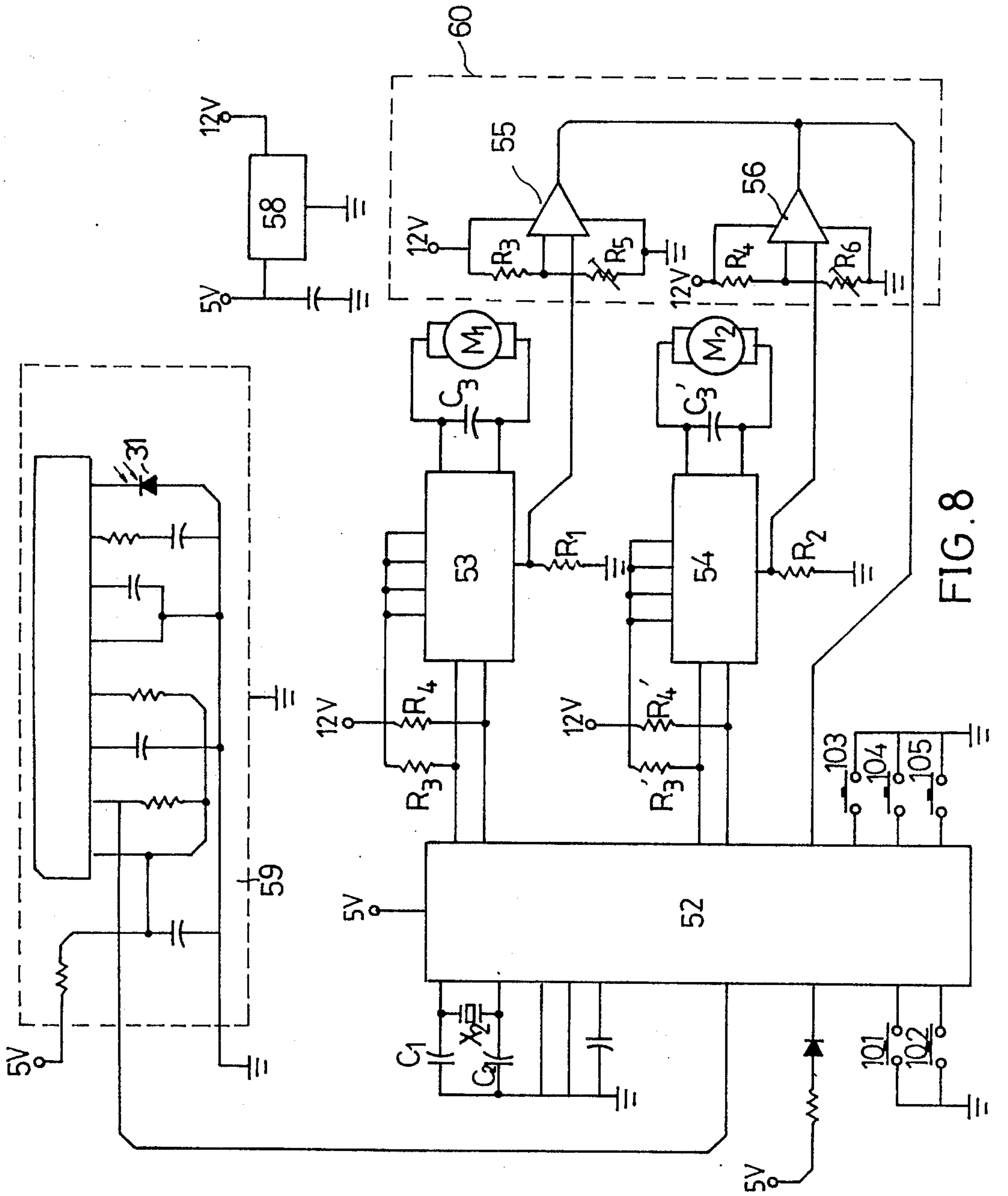
FIG. 8 is a control circuit diagram of the infrared receiver of the venetian blind controller indicated in FIGS. 5 and 6.

Referring to FIG. 8, wherein illustrated is an infrared receiver control circuit diagram according to the present invention and generally comprised of an infrared receiver (31), an amplifying circuit (59), a microprogram control unit (MCU) (52), two driving circuits (53) and (54), two DC motors (M1, M2), a motor overload detecting circuit (60), and a power circuit (58), and in which the C1, C2 X2 form an oscillation circuit to provide the MCU (52) with an oscillation signal; R3, R4 (or R3', R4') are to provide the driving circuits (53, 54) with a working voltage; the C3, C3' are blocking capacitors to block up alternative current so as to protect the DC motors (M1, M2) from being burned out; the first DC motor (M1) is to extend out and draw up venetian blades together; the second DC motor (M2) is to regulate the angular position of venetian blades. In the motor overload detecting circuits (60), the R3, R5 are to provide the first comparator (55) with a standard voltage; the R4, R6 are to provide the second comparator (56) with a standard voltage; the R5, R6 are semi-adjustable resistances for adjusting the range of standard voltage; the R1, R2 are earthing resistances for picking up overload signal from the driving circuits (53, 54) and to provide the motor overload detecting circuit (60) with a voltage. When the infrared receiver (31) receives a signal during operation, the signal is sent to the MCU (52) for processing. Upon receipt of a signal, the MCU (52) sends a control signal to either driving circuit (53) or (54) according to the type of the signal thus received, to drive the DC motors (M1, M2) to rotate so that the connected venetian blind can be properly controlled. The motor overload detecting circuit (60) is to confine a limit in the operation of pulling out or drawing up venetian blades or setting the angular position of venetian blades. If the pull cord (42) or the beading cord (41) is not carried to run while the DC motor (M1) or (M2) keeps rotating, the DC motor (M1) or (M2) becomes overload, the driving circuit (53) or (54) becomes overload too, and an overload current will be produced in the earth terminal of the driving circuit (53) or (54). Under this condition, the motor overload detecting circuit (60) will send the voltage drop picked up from the earthing resistance (R1 or E2) of the driving circuit (53 or 54) to the comparators (55 or 56) for comparison to further provide the MCU (52) with a control signal so as to stop its output. Thus, the DC motor (M1 or M2) can be stopped and protected from damage. The MCU (52) includes a plurality of normal open buttons (101-105) for controlling a venetian blind in functions similar to the buttons in the circuit diagram of the infrared transmitter of FIG. 7, wherein the angle control button (101) is to turn venetian blades rightward; the angle control button (102) is to turn venetian blades leftward; the open button (103) is to pull up venetian blades together to permit the light pass through; the close button (104) is to extend out venetian blades to block up the light; and the stop button is to stop the operation of motors.

The releasable hand-operated/automatic dual usage venetian blind controller of the present invention can be conveniently installed to control any conventional venetian blind or curtain which is operated by means of cords. During installation to connect the present invention to a venetian blind, mount the beading cord (41) of such a venetian blind on the beading cord driving wheel (4) of the present invention, and mount the pull cord (42) of the venetian blind on the pull cord driving wheel (16) letting the pull cord (42) be firmly pressed by the two pressure wheels (21) and (22). Then, fixedly attach the controller of the present invention to a window frame or wall at a proper position. After the cover (13) is attached, the installation is completed. Thus, through remote control, the beading cord driving wheel (4) and the pull cord driving wheel (16) can be controlled to rotate to further pull the beading cord (41) (which regulates the angular position of venetian blades) or the pull cord (42) (which control venetian blades to extend out or draw up together) to move. Through the arrangement of the speed reducing gear sets, the beading cord driving wheel (4) and the pull cord driving wheel (16) are permitted to rotate freely during power failure, i.e. they can be directly pulled to rotate by means of the beading cord (41) or pull cord (42) without dismounting the beading cord (41) and the pull cord (42) from the beading cord driving wheel (4) and the pull cord driving wheel (16). If two ropes are used for the beading cord and the pull cord of a venetian blind, the beading cord driving wheel (4) of the venetian blind controller of the present invention must be replaced with an additional pull cord driving wheel (16).

What is claimed is:

1. An attachable hand-operated/automatic dual usage venetian blind controller, including two DC motor and speed reducing gear set assemblies, a housing, an inner casing, an outer cover, a beading cord driving wheel, a pull cord driving wheel, two guide wheels, two pressure wheels, a spring, an infrared transmitter, and an infrared receiver control circuit, said inner casing being received in said housing covered with said outer cover and having two holes for positioning therein said two DC motor and speed reducing gear set assemblies respectively, said infrared receiver control circuit being mounted on said inner casing at its back side, said beading cord driving wheel being mounted on a shaft on one of said two DC motor and speed reducing gear set assemblies and having a circular channel for mounting thereon a beading cord of a venetian blind, and a plurality of round holes bilaterally disposed on the two circular side walls defined by its circular channel, said pull cord driving wheel being made of resilient rubber material for mounting thereon of a pull cord of same venetian blind and fixedly attached to the other one of said two DC motor and speed reducing gear set assemblies, said two guide wheels being respectively mounted on two elongated plates at one ends thereof and firmly secured to said inner casing between said beading cord driving wheel and said pull cord driving wheel, said two pressure wheels being mounted on said two elongated plates at the opposite ends thereof, said spring being connected between said two elongated plates to constantly pull said two pressure wheels inward to press on any cord mounted on the circular channel of said pull cord driving wheel, said infrared receiver control circuit being comprised of an infrared receiver, a microprogram control unit, two driving circuits and two motor overload detecting circuits, wherein said infrared receiver control circuit drives either one of said two DC motor and speed reducing gear set assemblies to carry said beading cord driving wheel or said pull cord driving wheel to rotate, according to the signal received from said infrared transmitter, to further pull out or draw up the blades of the connected venetian blind or turn the blades of such a venetian blind to change their angular position.

2. A venetian blind controller according to claim 1, wherein said two DC motor and speed reducing gear set assemblies each is comprised of a motor having mounted thereon a speed reducing gear set with an elongated shaft upstanding therefrom for securing thereto said beading cord driving wheel or said pull cord driving wheel, said speed reducing gear set being specially designated to change the revolving speed of said DC motor to a suitable speed ratio so that the moving of the blades of a connected venetian blind can be controlled moderately, the blades of such a venetian blind can also be operated by its cords through hand operation during power failure.

3. A venetian blind controller according to claim 1, wherein said motor overload detection circuits confine a limit operation of pulling out or drawing up venetian blades or venetian blades angular position control so that an overload current can be produced at an earth terminal of said driving circuits said two DC motor and speed reducing gear set assemblies are stalled, and said overload detecting circuits send a voltage drop signal picked up from an earthing resistance of either one of said two driving circuits to a comparator for comparison to further provide said microprogram control unit with a control signal so as to stop the operation of said DC motors.

4. A venetian blind controller according to claim 1, wherein said beading cord driving wheel can be replaced by a pull cord driving wheel so that the controller can be used to fit any conventional venetian blind or window curtain.

* * * * *